United States Patent [19]

Hatfield

[11] Patent Number: 4,863,681
[45] Date of Patent: Sep. 5, 1989

[54] REPLACEMENT ROD
[75] Inventor: Stephen C. Hatfield, Granby, Conn.
[73] Assignee: Combustion Engineering, Inc., Windsor, Conn.
[21] Appl. No.: 160,480
[22] Filed: Feb. 25, 1988
[51] Int. Cl.⁴ ............................................. G21C 3/10
[52] U.S. Cl. .................................. 376/451; 376/440
[58] Field of Search ............................ 376/440, 451
[56] References Cited
U.S. PATENT DOCUMENTS

| 3,291,698 | 12/1966 | Fortescue | 376/451 |
| 3,454,468 | 7/1969 | Ferreira | 316/451 |
| 3,702,282 | 11/1972 | Gatley | 376/451 |
| 3,816,248 | 6/1974 | Cayol | 376/451 |
| 3,944,468 | 3/1976 | Duret | 376/451 |
| 4,657,733 | 4/1987 | Millot | 376/451 |

Primary Examiner—Donald P. Walsh

[57] ABSTRACT

A solid or hollow replacement rod 40 for use in a pressurized water reactor (PWR) fuel assembly 10 inserts into cells of the spacer grids 18, 20 and 22 past mixing vanes 32, without damaging them, because of its asymmetric tip 42 formed by chamfer 54 and elongated curved surface 52 and its offset 'x' formed by the bowed end section 44.

12 Claims, 4 Drawing Sheets

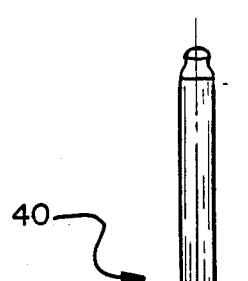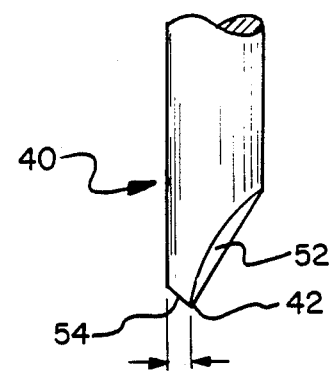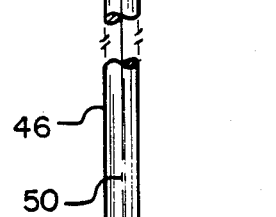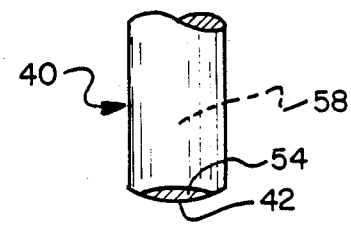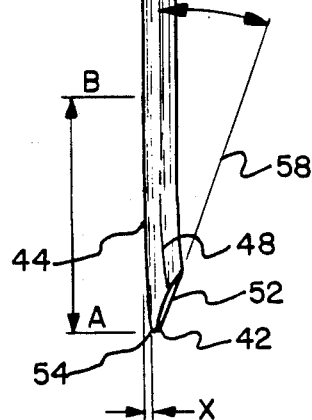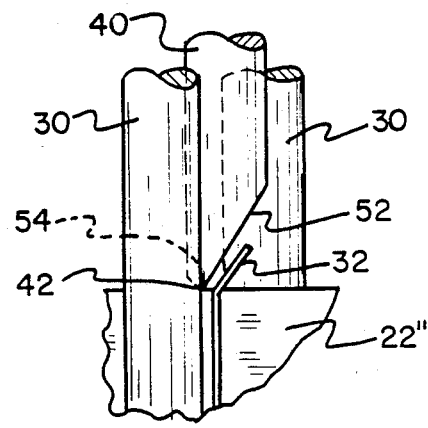
Fig. 8
Fig. 9
Fig. 10
Fig. 15

REPLACEMENT ROD

FIELD OF THE INVENTION

This application relates to an elongated replacement rod for use with nuclear fuel assemblies of the type having two end fittings connected by guide tubes. A plurality of fuel rod and guide tube cell defining spacer grids containing fuel rod support features and optional reactor coolant mixing vanes are secured to the guide tubes in register between the end pieces at spaced intervals.

BACKGROUND OF THE INVENTION

Pressurized Water Reactors (PWR) for nuclear steam generating systems require fuel reconstitution in the form of fuel rod and "poison" rod replacement for proper fuel cycle management within the core. Removal and replacement of rods after operation of the assembly must be accomplished remotely because of the radiation field surrounding the fuel assembly. Grid damage during subsequent rod insertion, or the use of specialized tooling or procedures to prevent grid damage, can be expensive and time-consuming. The use of specially fabricated replacement rods as substitutes for removed fuel and poison rods has been a common past practice, and the current invention is a design for these replacement rods which minimizes the potential for grid damage.

BRIEF DESCRIPTION OF THE PRIOR ART DRAWINGS

FIG. I is a side elevational view of a typical nuclear fuel assembly of the type which uses replacement rods;

SUMMARY OF THE INVENTION

The invention relates to a replacement rod for use with PWR's having fuel assemblies with two end fittings connected by guide tubes with a plurality of rod and guide tube cell defining spacer grids. Each cell has rod support features and, typically, reactor coolant mixing vanes. The grids are secured to the guide tubes in register between the end fittings at spaced intervals. The novel rod of the invention has a shank portion and an asymmetrically beveled tip. The tip is located at the end of a diverging lower end portion of the rod and has a chamfer which is greater in the direction of the cell interior than are the rod support features. The chamfer is located on the rod tip opposite to an elongated curved surface portion which offsets the tip and extends toward the shank portion for a distance which approximates the distance between grids. The rod thus rides along adjacent rod shanks as it approaches a grid, and as it is inserted further it centers itself in its cell with minimum grid and grid vane damage. This lessens the chance that broken vanes can become loose rod damaging debris in the reactor.

BRIEF DESCRIPTION OF THE DRAWINGS OF THE INVENTION

FIG. 8 is a side elevational view of the novel elongated replacement rod of the invention;

FIG. 9 is an enlarged side elevational view of the tip of the novel replacement rod of FIG. 8.

Figure 4:
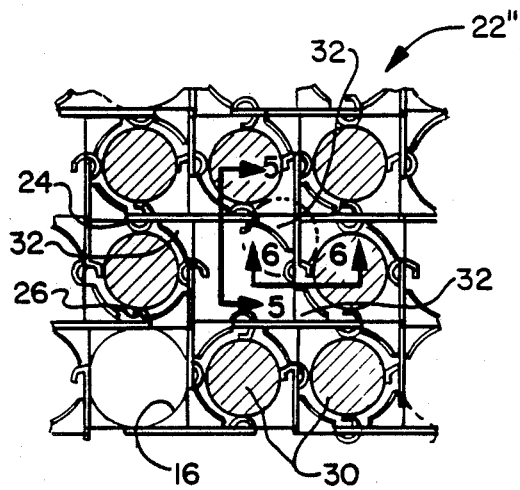
FIG. 4 is an enlarged fragmentary view of a portion of the FIG. 3 mixing grid with a typical prior art replacement rod shown in phantom in the initial stage of insertion.
Figure 5:
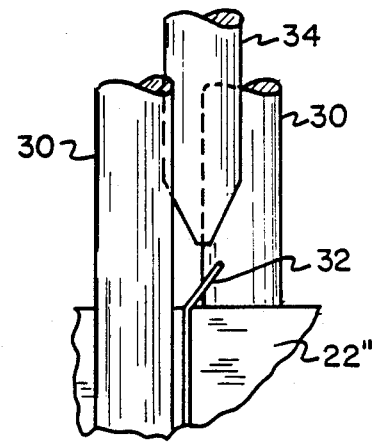
FIG. 5 is a view taken substantially along the line 5—5 in FIG. 4 with the typical prior art replacement rod shown in full in the initial stage of insertion.
Figure 6:
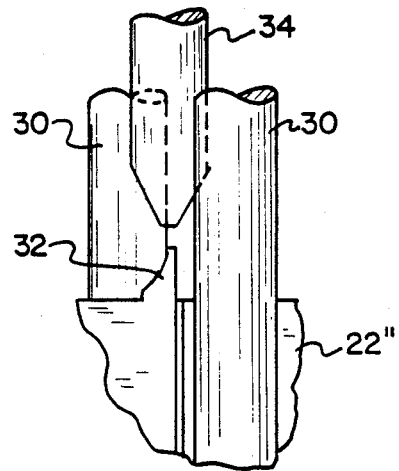
FIG. 6 is a view similar to FIG. 5 taken substantially along the line 6—6 in FIG. 4.
Figure 11:
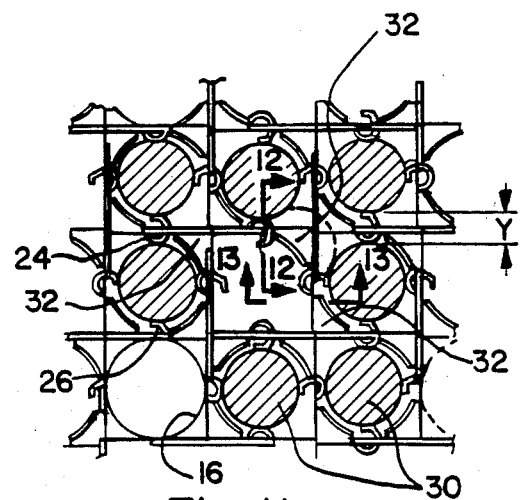
Figure 12:
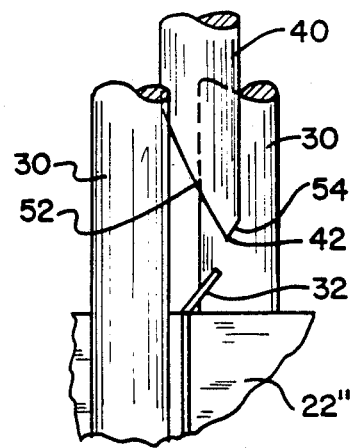
Figure 13:
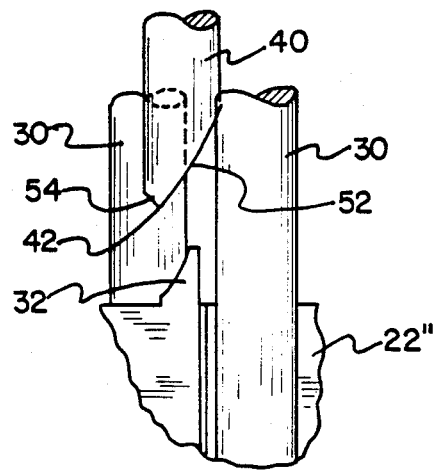

FIG. 10 is a view similar to FIG. 9 taken from its left side at 90° thereto;

FIG. 11 is a view similar to prior art FIG. 4 with the novel replacement rod of FIGS. 8 to 10 shown in phantom in the initial stage of insertion;

FIG. 12 is a view taken substantially along the 12—12 of FIG. 11 with the novel replacement rod shown in full in the initial stage of insertion;

FIG. 13 is a view similar to FIG. 12 taken substantially along the line 13—13 in FIG. 11.

Figure 14:
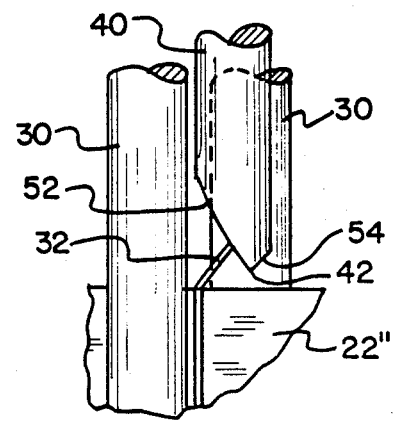

FIG. 14 is a view showing the novel replacement rod in a later stage of insertion in non-damaging contact with a mixing grid vane.

Figure 7:
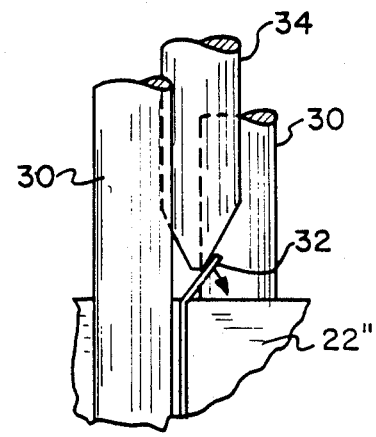
FIG. 7 is a view similar to FIG. 5 showing the typical prior art replacement rod in a later stage of insertion in damaging contact with a mixing grid vane.

FIG. 15 is a view of the replacement rod of FIGS. 8 to 10 in an inadvertent and undesirable orientation similar to FIG. 7 with respect to a mixing grid vane.

DETAILED DESCRIPTION OF THE PREFERRED EMBODIMENT

The numeral 10 in FIG. I generally designates a fuel assembly for a pressurized water nuclear reactor. The fuel assembly 10 includes an upper end fitting 12 and a lower end fitting 14 connected by a plurality of guide tubes or thimbles 16 for receipt of control elements, in known manner.

Cell-defining spacer grids 18, 20 and 22 have fuel or poison rod support features in the form of arches 24 and opposing springs 26, in known manner, and are secured at spaced intervals to the guide tubes 16 with their cells in register. The fuel rods or poison rods 30 are dotted in in FIGS. 2 and 3, shown in cross-section in FIGS. 4 and 11 and are shown partially in full in FIGS. 5–7 and 12-15.

Figure 1:
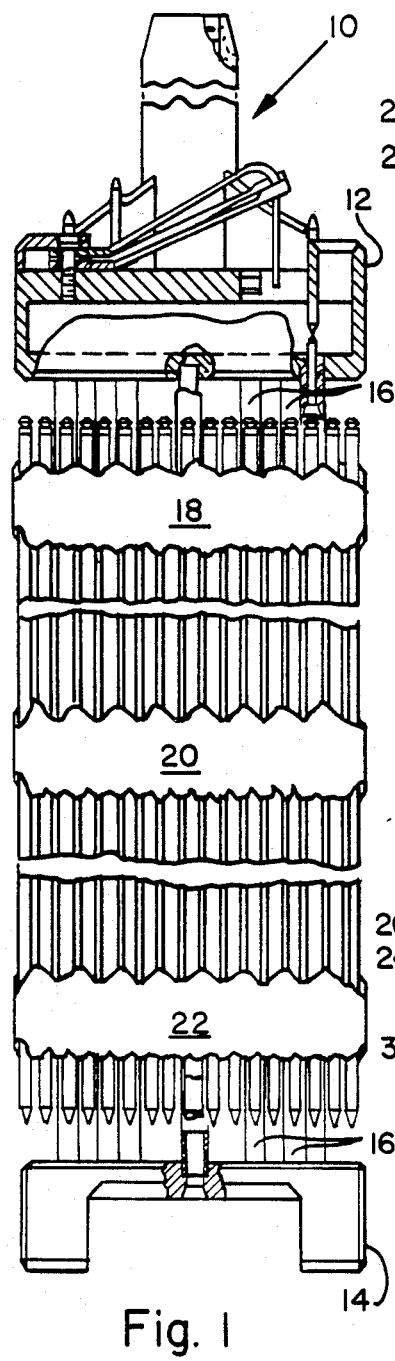
Figure 2:
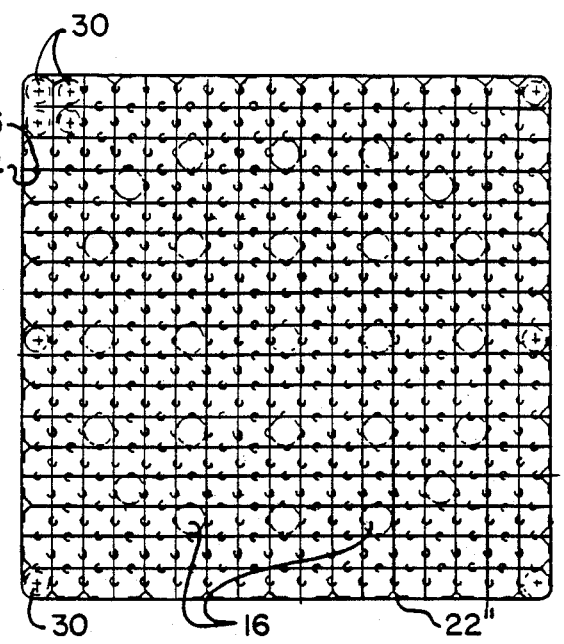
FIG. 2 is a schematic plan view of a typical non-mixing fuel assembly grid with rod and guide tube cells including rod support features therein.
Figure 3:
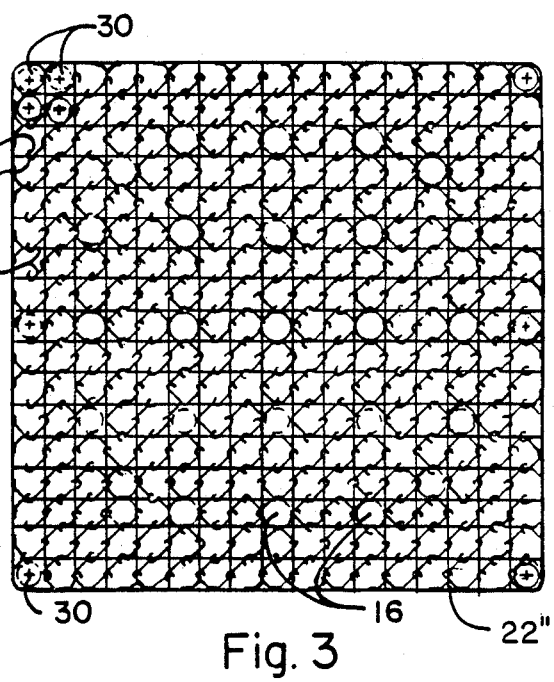
FIG. 3 is a schematic plan view of a typical mixing fuel assembly grid with guide tube cells, and rod cells having flow deflecting vanes in alignment therewith; and rod support features therein.

The grid 22' of FIG. 2 is simpler than the grid 22" of FIG. 3 in that the former includes no mixing vanes in the coolant flow paths while the latter includes vanes 32. The critical problems involved in inserting replacement rods are more severe in the case where the fuel assembly 10 includes grids with vanes 32 like the grid 22" in FIG. 3. However, replacement rods of the novel structure of the invention will provide an improved ease of insertion in the fuel assembly even for a FIG. 2 type of grid 22'.

The enlarged portion of grid 22" as shown in FIGS. 4 and 11 includes vanes 32. Since vanes 32 extend partially into the cells of grid 22", when it is viewed in the plan views of FIGS. 4 and 11, it will be clear that there is a potential for grid damage when a symmetrical prior art replacement rod 34 is inserted into a cell of the grid 22".

The preferred embodiment of the invention is a novel replacement rod 40, as shown in FIGS. 8 to 10. It is designed for use with spacer grids like grid 22'' with mixing vanes 32 in that it minimizes damage to the vanes during the rod installation process. The replacement rod can be a pure fuel rod or may include "poison" for fuel moderating and management. Alternately, it could be a "dummy" constructed from a solid metallic bar or hollow tubing with welded end plugs.

FIGS. 4-7 depict the problem with inserting rods which have conventional end cap designs. If the rod 34 is approximately centered in the array as it approached a grid, it will feed itself through the grid properly regardless of the grid design. However, it can be seen that a prior art off-center rod 34 will guide itself into grids which do not contain mixing vanes 32, but will not do so in all cases when vanes 32 are present. It is likely that the mixing vane 32 will be damaged, and possibly the adjacent rod loosened in its grid cell, because of the wedging action inherent in the contact geometry between the vane 32 and rod 34. Also, the bending action depicted in FIG. 7 could fracture vane 32, in which case it would become potentially damaging debris within the reactor system.

FIGS. 11-14 demonstrate how the new rod 40 prevents damaging interference with the vanes 32. (For this discussion, it will be assumed that any grid cells adjacent to the open cell re filled with rods or guide thimbles, since this is the standard practice for reconstitution.) When the tip 42 of the rod 40 approaches any grid other than the uppermost one in the fuel assembly, two special features of rod 40 result in two separate actions.

First, rod 40 has a tip offset feature or permanently diverging portion 44 between the tip 42 and the shank 46; this is the portion of rod 40 between the arrows A and B in FIG. 8. Its length is approximately equal to the distance between grids 18, 20 and 22. The diverging portion 44 has a centerline 48 which diverges from the centerline 50 of shank portion 46 to locate the end of diverging or bowed portion 44 adjacent the tip 42 out of alignment with the shank portion 46 by an amount "x" (FIG. 8) greater than the rod separation "y" (FIG. 11) within the fuel assembly 10.

In combination with the grids through which the rod has already passed, the tip offset feature 44 ensures that the rod 40 slides along the surface of one or more often two rods 30 (or one rod 30 and a thimble 16) during insertion. The centerline 48 diverges from centerline 50 to locate the tip out of alignment with the shank portion by the amount "x" which is less than an amount which permits the rod 40 to be improperly guided into a grid cell location in lower grids 20 and 22 out of register with the grid cell location of grid 18 in which the shank portion 46 is located.

Second, an elongated curved surface 52 at the tip 42 and an opposing chamfered portion 54 at the tip 42, together make up an asymmetrically beveled tip 42 such that the centerline of the elongated curved portion 52 has an intersecting centerline 58 tilted with respect to the centerline 48 of the diverging portion and defines a plane of symmetry with it. The chamfer 54 is greater in distance in the direction of the cell interior (see FIGS. 11-14) than are the rod support features 24 and 26.

This feature of the replacement rod (the curved, eccentric tip) comes into play as the rod contacts a mixing vane 32 or horizontal grid strip. As seen in FIGS. 11-14, if the rod is located in a corner of the cell with a mixing vane and the eccentric cladding tip 42 of the rod is diagonally inboard in the grid cell, the rod will guide itself over the vane and into the cell without damage. Obviously, if the rod is located in a non-vane corner or over a straight strip at the cell centerline, it will also guide itself into the cell. Under the procedure described above, no special rotational control of the rod is necessary.

For some fuel assembly designs, it may be desirable to control the cell corner into which the rod is being inserted. As a first step in these cases, the replacement rod 40 is positioned with its two special features in a known orientation. The equipment operator then grips the rod with a rod handling tool, maintaining some reference as to the orientation. As the rod is inserted into the fuel assembly, the operator has the capability of rotating the tool and thus preferentially directing the rod features.

Since the operator has knowledge of the direction of the rod offset to begin with, and can rotate the rod, he has control over the specific cell corner where initial contact will occur. Because the asymmetric or eccentric tip and rod offset features have an established relationship, the operator can prevent damage by properly controlling rod orientation during insertion into each grid. (In most fuel assembly designs, it would be unnecessary to rotate the rod between one grid elevation and the next since the vane configuration does not change.)

A side benefit of the new rod 40 comes about in the case of rod insertion into peripheral grid cells. In several past instances, insertion of rods 30 into peripheral cells in assemblies has resulted in the rods snaking out of the assembly. This may have been due to misalignment between the rod handling tool and the assembly, or to a combination of radiation-induced rod bow and the absence of constraint on all sides by surrounding rods. The new rod 40 prevents this problem since the replacement rod can be oriented in such a manner as to tilt the tip 42 into one of the two interior corners of each peripheral cell.

Another advantage is the minimization of damage to a vane 32 if the tip 42 offset feature somehow fails to locate the tip properly. FIG. 15 demonstrates how the eccentric tip, if it becomes wedged behind a mixing vane, will create less damage to the vane than that when a conventional tip is involved (FIG. 7).

The replacement rod 40 described will eliminate a major disadvantage associated with mixing vane grids. While it does not cover the situation where a given fuel rod must be removed an then returned to its original location, future cases where this is necessary are expected to be relatively rare since devices are available to identify failed and non-failed rods prior to any removal operation. Thus, in most cases only failed rods will be removed. These rods must be replaced with substitute rods since they will continue to leak fission products from the nuclear reaction if they are returned to the reactor.

What is claimed:

1. In an elongated replacement rod for use with fuel assemblies of the type having two end fittings connected by guide tubes with a plurality of rod and guide tube cell defining spacer grids containing rod support features and mixing vanes, said grids secured to said guide tubes in register between said end fittings at spaced intervals and said fuel rod comprising:
   an asymmetrically beveled tip;
   a shank portion having a straight centerline; and
   a permanently diverging portion between said tip and said shank portion.

2. The rod of claim 1 in which the permanently diverging portion has a centerline which diverges from the shank portion centerline to locate the end of the diverging portion adjacent the tip out of alignment with the shank portion by an amount greater than the rod separation within said fuel assembly.

3. The rod of claim 2 in which the permanently diverging portion has a centerline which diverges from the shank portion centerline to locate the end of the diverging portion adjacent the tip out of alignment with the shank portion by an amount less than an amount which permits the rod to be improperly guided into a grid cell location out of register with a shank containing grid cell.

4. The rod of claim 1 in which the asymmetrically beveled tip includes a chamfer and an elongated curved surface.

5. The rod of claim 1 in which the asymmetrically beveled tip includes an elongated curved surface portion.

6. The rod of claim 5 in which the permanently diverging portion has a centerline and the elongated curved portion has an intersecting centerline titled with respect to the centerline of the diverging portion.

7. The rod of claim 5 in which the asymmetrically beveled tip includes a chamfer opposite to the elongated curved surface portion.

8. The rod of claim 7 in which the asymmetrically beveled tip chamfer is greater in distance in the direction of the cell interior than are the rod support features.

9. The rod of claim 1 in which the permanently diverging portion is a bowed portion.

10. The rod of claim 1 in which the permanently diverging portion has a length approximately equal to the distance between two adjacent spaced grids of a fuel assembly.

11. The rod of claim 6 in which the permanently diverging centerline and the elongated curved portion centerline define a plane of symmetry of the elongated curved portion.

12. In an elongated replacement rod for use with fuel assemblies of the type having two end fittings connected by guide tubes with a plurality of rod and guide tube cell defining spacer grids with rod support features and mixing vanes, said grids secured to said guide tubes in register between said end fittings at spaced intervals, said rod comprising:
a shank portion;
an asymmetrically beveled tip;
said tip having a chamfer which is greater in the direction of the cell interior than are the rod support features and said chamfer being located on said tip opposite to an elongated curved surface portion thereof which extends a greater longitudinal distance toward the shank portion than does the chamfer.

* * * * *